United States Patent
Yano et al.

(10) Patent No.: US 6,174,624 B1
(45) Date of Patent: Jan. 16, 2001

(54) POSITIVE-ELECTRODE ACTIVE MATERIAL FOR ALKALINE SECONDARY BATTERY AND AN ALKALINE SECONDARY BATTERY

(75) Inventors: Mutsumi Yano, Hirakata; Mitsunori Tokuda, Osaka; Mitsuzou Nogami, Itano-gun; Shin Fujitani; Koji Nishio, both of Hirakata, all of (JP)

(73) Assignee: Sanyo Electric Co., Ltd., Osaka (JP)

( * ) Notice: Under 35 U.S.C. 154(b), the term of this patent shall be extended for 0 days.

(21) Appl. No.: 09/267,399

(22) Filed: Mar. 15, 1999

(30) Foreign Application Priority Data

Mar. 16, 1998 (JP) .................................. 10-065131
Feb. 16, 1999 (JP) .................................. 11-037463

(51) Int. Cl.$^7$ .................................................... H01M 4/58
(52) U.S. Cl. ...................... 429/218.1; 429/223; 429/224; 429/229
(58) Field of Search ..................... 429/223, 224, 429/218.1, 229

(56) References Cited

U.S. PATENT DOCUMENTS 5,773,169 * 6/1998 Matsuda et al. ...................... 429/223
5,780,184 * 7/1998 Coco et al. .......................... 429/217

FOREIGN PATENT DOCUMENTS

| 0 523 284 A2 | 1/1993 | (EP) . |
| 0 633 223 A1 | 1/1995 | (EP) . |
| 0 793 285 | * 9/1997 | (EP) . |
| 5-21064 | 1/1993 | (JP) . |
| 7-335214 | 12/1995 | (JP) . |

OTHER PUBLICATIONS

Indira et al., Electrosynthesis of layered double hydroxides of nickle with trivalent cations, Journal of Power Sources 52 (1994) pp. 93–97.

* cited by examiner

Primary Examiner—Laura Weiner
(74) Attorney, Agent, or Firm—Armstrong, Westerman, Hattori, McLeland & Naugton

(57) ABSTRACT

A positive-electrode active material for alkaline secondary battery according to the invention has an $\alpha$-Ni(OH)$_2$ crystal structure which incorporates therein manganese and a trivalent metal other than manganese.

5 Claims, 1 Drawing Sheet

POSITIVE-ELECTRODE ACTIVE MATERIAL FOR ALKALINE SECONDARY BATTERY AND AN ALKALINE SECONDARY BATTERY

BACKGROUND OF THE INVENTION

The present invention relates generally to a positive-electrode active material for alkaline secondary battery and an alkaline secondary battery. In particular, the invention is directed to an improved positive-electrode active material for alkaline secondary battery employing a nickel hydroxide material such that the occurrence of leakage of gas, an electrolyte solution and the like is prevented in a case where the discharged alkaline secondary battery is stored under high temperature conditions and thereafter subject to a charge/discharge process.

DESCRIPTION OF THE RELATED ART

In past, various types of alkaline secondary batteries have been used whereas manganese dioxide or nickel hydroxide has been generally used as the positive-electrode active material for use in such alkaline secondary batteries.

In the case of the positive-electrode active material employing manganese dioxide, the charge/discharge reaction process suffers low reversibility, which results in an alkaline secondary battery failing to present a satisfactory charge/discharge cycle performance.

On this account, the use of nickel hydroxide as the positive-electrode active material for alkaline secondary battery has spread. On the other hand, various studies have been made on the improvement of the positive-electrode active materials employing nickel hydroxide.

More recently, Japanese Unexamined Patent Publication No. 5(1993)-21064 has proposed an alkaline secondary battery improved in the charge/discharge cycle performance by using a positive-electrode active material including nickel hydroxide with manganese, cadmium or the like added thereto. Alternatively, Japanese Unexamined Patent Publication No. 7(1995)-335214 has proposed a positive-electrode active material which includes nickel hydroxide incorporating therein trivalent manganese for achieving improved capacity and cycle stability thereof.

Unfortunately, a problem exists with the alkaline secondary batteries using the positive-electrode materials proposed by such official gazettes. If such an alkaline secondary battery, in a discharged state, is stored under high temperature conditions for an extended period of time and then is charged, the positive electrode produces oxygen gas to cause leakage of gas, electrolyte solution or the like. This results in a reduced battery capacity. Particularly, in an alkaline secondary battery of an inside-out type construction wherein a battery case contains increased amounts of positive-electrode active material and negative-electrode active material for achieving high battery capacity, frequent occurrences of the leakage of gas or electrolyte solution are responsible for a notable decline in the battery capacity.

SUMMARY OF THE INVENTION

In view of the foregoing, one objective of the invention is a positive-electrode active material for use in an alkaline secondary battery, which material comprises nickel hydroxide and is less susceptible to crystal structure transformation when the discharged alkaline secondary battery is stored under high temperature conditions.

Another objective of the invention is an alkaline secondary battery employing nickel hydroxide as the positive-electrode active material, which battery does not suffer the decline in the battery capacity by virtue of the prevention of occurrence of the leakage of gas or electrolyte solution when the battery is subjected to the charge/discharge process after having been stored in the discharged state and under high temperature conditions.

The positive-electrode active material for alkaline secondary battery in accordance with the invention has an $\alpha$-Ni(OH)$_2$ crystal structure incorporating therein manganese and a trivalent metal other than manganese.

In the positive-electrode active material for alkaline secondary battery according to the invention, manganese and the trivalent metal other than manganese incorporated in $\alpha$-Ni(OH)$_2$ are normally substituted with nickel contained in $\alpha$-Ni(OH)$_2$.

If manganese and the trivalent metal element other than manganese are incorporated in $\alpha$-Ni(OH)$_2$ as suggested by the positive-electrode active material for alkaline secondary battery according to the invention, sulfate ions in this $\alpha$-Ni(OH)$_2$ crystal structure are less liable to escape therefrom. Therefore, when stored under high temperature conditions, the positive-electrode active material can retain the $\alpha$-Ni(OH)$_2$ crystal structure and hence, is less susceptible to transformation into a $\beta$-Ni(OH)$_2$ crystal structure. Thus, when charged, the positive-electrode active material is transformed into $\gamma$-NiOOH producing less oxygen gas.

In the positive-electrode active material for alkaline secondary battery according to the invention, the trivalent metal other than manganese is comprised of at least one metal element selected from the group consisting of, for example, scandium Sc, yttrium Y, lanthanide, aluminum Al and bismuth Bi. It is particularly preferred to use at least one metal element selected from the group consisting of erbium Er, yttrium Y and aluminum Al. It is more preferred to use, in combination, two or more types selected from the group consisting of erbium, yttrium and aluminum.

If, in the positive-electrode active material for alkaline secondary battery according to the invention, an excessive amount of manganese and the trivalent metal other than manganese is incorporated in $\alpha$-Ni(OH)$_2$, the positive-electrode active material contains an insufficient amount of Ni. This leads to a failure to achieve a sufficient battery capacity. If, on the other hand, the content of manganese and the trivalent metal other than manganese is insufficient, the $\alpha$-Ni(OH)$_2$ crystal structure is more susceptible to the transformation when stored under high temperature conditions. Thus, the preservability of the battery is lowered under high temperature conditions. Accordingly, manganese is preferably present in a proportion of between 8 and 50 mol % based on total metal elements of the positive-electrode active material, and more preferably between 8 and 30 mol %. The trivalent metal other than manganese is preferably present in a proportion of between 0.3 and 10 mol % based on total metal elements of the positive-electrode active material and more preferably between 1 and 5 mol %.

Where the alkaline secondary battery, employing the aforesaid positive-electrode active material for alkaline secondary battery, is discharged and then stored for an extended period of time under high temperature conditions, the positive-electrode active material retains the $\alpha$-Ni(OH)$_2$ crystal structure and hence, is less susceptible to the transformation into the $\beta$-Ni(OH)$_2$ crystal structure, as described above. When this alkaline secondary battery is subsequently subject to the charge/discharge process, the charged positive-electrode active material goes through the transformation into $\gamma$-NiOOH which, in turn, suppresses the oxygen gas production. Thus, the alkaline secondary battery does not suffer the lowered battery capacity resulting from the leakage of gas or electrolyte solution.

Where increased amounts of positive-electrode active material and negative-electrode active material are loaded in the battery case for achieving a high battery capacity, or particularly in the case of the alkaline secondary battery of inside-out type construction wherein the positive-electrode and negative-electrode active materials constitute not less than 70% in total by volume of the battery case, the battery suffers less leakage of gas or electrolyte solution if the discharged battery is stored under high temperature conditions and thereafter is subject to the charge/discharge process. Thus, the battery presents the high battery capacity even after the storage in the discharged state and under high temperature conditions.

In the alkaline secondary battery according to the invention, the negative-electrode active material for negative electrode is not particularly limited and zinc, hydrogen-absorbing alloys and the like, which are normally used in the alkaline secondary batteries, may be used. However, zinc having a small electrochemical equivalent and electrode potential is preferably used for obtaining an alkaline secondary battery of high energy density.

These and other objects, advantages and features of the invention will become apparent from the following description thereof taken in conjunction with the accompanying drawing which illustrates specific embodiments of the invention.

DESCRIPTION OF THE PREFERRED EMBODIMENTS

Figure 1:
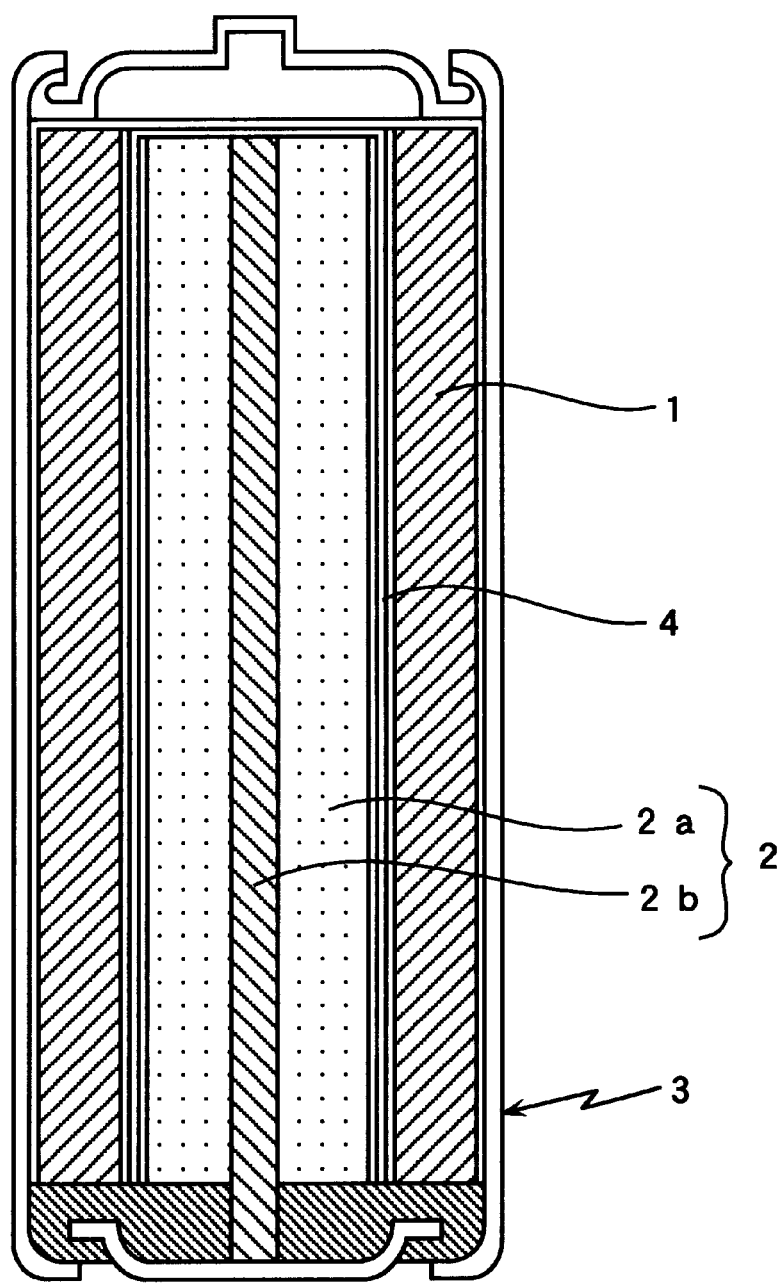
FIG. 1 is a schematic sectional view showing an internal construction of an alkaline secondary battery fabricated in examples and comparative examples of the invention.

The following examples specifically illustrate the positive-electrode active material for use in the alkaline secondary battery and the alkaline secondary battery employing this positive-electrode active material according to the invention. Further, comparative examples are given to clarify that the alkaline secondary batteries of examples hereof present high battery capacities by virtue of reduced occurrence of the leakage of gas or electrolyte solution even if the batteries are subject to the charge/discharge process after having been discharged and then stored under high temperature conditions. It should be noted that the positive-electrode active material for alkaline secondary battery and the alkaline secondary battery according to the invention are not limited to the following examples but variations and modifications thereto may be made within the scope and spirit of the invention.

(Examples a1 to a8 and Comparative Examples a1 to a4)

In Examples a1 to a8 and Comparative Examples a1 to a4, a positive electrode and a negative electrode were prepared in the following manners and were used for fabricating an alkaline secondary battery (AA-size) of inside-out type construction as shown in FIG. 1.

(Preparation of Positive Electrode)

In Comparative Example a1, a positive-electrode active material was prepared by using nickel sulfate and manganese sulfate. In Examples a1 to a8 and Comparative Examples a2 to a4, the positive-electrode active material was prepared by using nickel sulfate, manganese sulfate and a sulfate of any one of various metals (M) as shown in Table 1 as below.

To a solution mixture containing nickel sulfate, manganese sulfate and a sulfate of (M) in a composition ratio of Ni:Mn:(M) shown in Table 1, there was added a solution mixture containing 10% ammonia and 10% sodium hydrate. The pH of the resultant solution mixture was adjusted to 10.0±0.4 thereby to obtain a precipitate. The precipitate was filtered off and then was kept in a 20% KOH aqueous solution at room temperatures for one week. Subsequently, the precipitate was washed and filtered off, thereby to obtain the positive-electrode active material for use in the alkaline secondary battery of each of Examples a1 to a8 and Comparative Examples a1 to a4.

The X-ray diffraction (XRD) was used to study crystal structures of these positive-electrode active materials to find that these active materials had the $\alpha$-$Ni(OH)_2$ crystal structure. On the other hand, the positive-electrode active materials used in Examples a1 to a8 and Comparative Examples a1 to a4 were studied by using the electron probe microanalysis (EPMA). Although a minor maldistribution was observed in the positive-electrode active materials of Example a5 using Nd as the aforesaid metal element (M) and of Example a8 using Bi, $\alpha$-$Ni(OH)_2$ of each of the other examples and comparative examples formed a uniform solid solution with each corresponding metal (M).

The positive electrode 1 was prepared by the steps of adding 10 parts by weight of graphite to 90 parts by weight of each of the above positive-electrode active materials, and press-molding the resultant mixture into a cylinder having an outside diameter of 13.3 mm and an inside diameter of 10.3 mm.

(Preparation of Negative Electrode)

Preparatory to the preparation of the negative electrode, a negative electrode mixture was prepared in the following manner. Zn and ZnO were mixed together in a ratio of 2:1. To this mixture, 2.5 wt % of $In_2O_3$ for suppressing the generation of hydrogen, 1.0 wt % of carboxymethylcellulose as a binder, and 0.5 wt % of polytetrafluoroethylene were added. A suitable amount of water was added to this mixture such that a weight ratio of water was about ⅕ based on the negative-electrode active material. The resultant mixture was kneaded thereby to obtain the negative electrode mixture. Then, as shown in FIG. 1, the aforesaid negative electrode mixture 2a was press-fitted around a collector bar 2b formed of an indium-plated copper bar and having a diameter of 2.5 mm, thereby to obtain the negative electrode 2 having a diameter of 6.8 mm and a longitudinal length of 38 mm.

(Fabrication of Battery)

A battery as shown in FIG. 1 was fabricated in the following manner. Each of the positive electrodes 1 thus prepared was inserted in a battery case 3. On the other hand, each corresponding negative electrode 2 was inserted in the inside circumference of the cylindrical positive electrode 1 via a separator 4 formed of a lamination of cellophane and vinylon. Then, 40 wt % KOH aqueous solution was poured into each battery case 3 in this state until the positive electrode 1 and the negative electrode 2 were completely immersed therein. Subsequently, an opening of each battery case was sealed thereby to complete each alkaline secondary battery. Incidentally, each alkaline secondary battery was provided with a gasket (not shown) for discharge of gas and the like.

The alkaline secondary batteries of Examples a1 to a8 and Comparative Examples a1 to a4 were tested in the following manner. In one charge/discharge cycle, each battery was charged at a charge current of 150 mA to a battery voltage of 1.95 V and thereafter discharged at a discharge current of 150 mA to a battery voltage of 1.0 V. Such a charge/discharge cycle was repeated 10 times to find a battery capacity $Q_1$ of each alkaline secondary battery on the tenth cycle. The results are shown in Table 1 as below.

Next, the alkaline secondary batteries discharged on the tenth cycle were stored at a high temperature of 65° C. for two weeks. Subsequently, the batteries were again subject to ten charge/discharge cycles in the same manner as the above so as to find battery capacities $Q_2$ of the alkaline secondary batteries at that point in time. At the same time, there were determined weight decreases from initial weights of the alkaline secondary batteries just fabricated. The results are shown in Table 1 as below.

TABLE 1

| | POSITIVE-ELECTRODE ACTIVE MATERIAL COMPOSITION RATIO (mol %) | | | | BATTERY CAPACITY (mAh) | | BATTERY WEIGHT DECREASE |
|---|---|---|---|---|---|---|---|
| | Ni | Mn | (M) | | $(Q_1)$ | $(Q_2)$ | (mg) |
| Example a1 | 80 | 18 | Sc | 2 | 1040 | 980 | 12 |
| Example a2 | 80 | 18 | Y | 2 | 1060 | 1010 | 0 |
| Example a3 | 80 | 18 | Er | 2 | 1070 | 1020 | 0 |
| Example a4 | 80 | 18 | La | 2 | 1050 | 970 | 8 |
| Example a5 | 80 | 18 | Nd | 2 | 1040 | 960 | 3 |
| Example a6 | 80 | 18 | Sm | 2 | 1030 | 980 | 6 |
| Example a7 | 80 | 18 | Al | 2 | 1060 | 1010 | 0 |
| Example a8 | 80 | 18 | Bi | 2 | 1050 | 980 | 12 |
| Comparative Example a1 | 80 | 18 | — | — | 1020 | 670 | 70 |
| Comparative Example a2 | 80 | 18 | Cd | 2 | 1020 | 670 | 70 |
| Comparative Example a3 | 80 | 18 | Mg | 2 | 1030 | 570 | 92 |
| Comparative Example a4 | 80 | 18 | Zn | 2 | 1020 | 630 | 97 |

According to the results regarding the battery capacities $Q_2$ of the alkaline secondary batteries which were subjected to 10 charge/discharge cycles after having been discharged and then stored for two weeks under high temperature conditions, the batteries of Examples a1 to a8, which employed the positive-electrode active materials each including $\alpha$-Ni(OH)$_2$ incorporating therein manganese and any one of the trivalent metals selected from Sc, Y, La, Nd, Sm, Al and Bi, presented much smaller capacity declines and also much smaller battery weight decreases resulting from the leakage of gas and electrolyte solution, as compared with the battery of Comparative Example a1 which included $\alpha$-Ni(OH)$_2$ incorporating therein only manganese but no other trivalent metal than manganese, and the batteries of Comparative Examples a2 to a4 which each included $\alpha$-Ni(OH)$_2$ incorporating therein manganese and any one of metals of not three valences selected from Cd, Mg and Zn.

According to a comparison among the alkaline secondary batteries of Examples a1 to a8, the batteries of Examples a2, a3 and a7, which respectively employed Y, Er and Al as the trivalent metal (M) other than manganese, presented smaller declines in battery capacity $Q_2$ than the batteries of the other examples. In addition, the former batteries suffered little battery weight decrease resulting from the leakage of gas or electrolyte solution.

The alkaline secondary batteries of Comparative Examples a1 to a4 were studied on the charge voltages thereof before and after two-week storage thereof at 65° C. in the discharged state as describe above. The results showed that the post-storage charge voltages of the batteries increased from the pre-storage charge voltages. Supposedly, this results from the transformation of $\alpha$-Ni(OH)$_2$ crystal structure into $\beta$-Ni(OH)$_2$ crystal structure.

(Examples b1 to b7)

In Examples b1 to b7, each positive-electrode active material was prepared by using Al as the trivalent metal (M) other than manganese, and contained Ni, Mn and Al in a composition ratio as shown in Table 2 as below. Except for the above, the same procedure as in the above Examples a1 to a8 was taken to fabricate the alkaline secondary batteries.

Similarly to the aforesaid Examples a1 to a8, the batteries of Examples b1 to b7 thus fabricated were studied on the battery capacities $Q_1$ thereof on the tenth charge/discharge cycle. Subsequent to the tenth discharge cycle, the alkaline secondary batteries were stored at 65° C. for two weeks. Then, at the completion of another ten charge/discharge cycles, battery capacities $Q_2$ of the alkaline secondary batteries were determined. At the same time, battery weight decreases from the initial weights right after the fabrication were determined for the respective batteries. The results are shown in Table 2 as below.

TABLE 2

| | POSITIVE-ELECTRODE ACTIVE MATERIAL COMPOSITION RATIO (mol %) | | | BATTERY CAPACITY (mAh) | | BATTERY WEIGHT DECREASE |
|---|---|---|---|---|---|---|
| | Ni | Mn | Al | $(Q_1)$ | $(Q_2)$ | (mg) |
| Example b1 | 91 | 7 | 2 | 1030 | 970 | 8 |
| Example b2 | 90 | 8 | 2 | 1060 | 1010 | 0 |
| Example b3 | 80 | 18 | 2 | 1060 | 1010 | 0 |
| Example b4 | 68 | 30 | 2 | 1040 | 1000 | 0 |
| Example b5 | 58 | 40 | 2 | 990 | 950 | 0 |
| Example b6 | 48 | 50 | 2 | 950 | 940 | 1 |
| Example b7 | 38 | 60 | 2 | 840 | 820 | 3 |

According to the results, with decrease in the amount of manganese contained in the positive-electrode active material, the alkaline secondary battery suffered greater decline in the battery capacity $Q_2$ when subjected to 10 charge/discharge cycles following the two-week storage in the discharged state and under high temperature conditions. Additionally, the battery also suffered greater weight decrease resulting from the leakage of gas or electrolyte solution. On the other hand, if the battery contains an increased amount of manganese, the battery contains a correspondingly decreased amount of nickel. Hence, the alkaline secondary battery containing the increased amount of manganese presented a small initial battery capacity right after the fabrication thereof. On this account, manganese is preferably present in a proportion of between 8 and 50 mol % and more preferably between 8 and 30 mol % based on total metal elements contained in the positive-electrode active material.

(Examples c1 to c13)

In Examples c1 to c13, each positive-electrode active material was prepared by using Al, Y or Er as the trivalent metal (M) other than manganese, and contained Ni, Mn and (M) in a composition ratio as shown in Table 3 as below. Except for the above, the same procedure as in the aforesaid Examples a1 to a8 was taken to fabricate each alkaline secondary battery.

Similarly to the aforesaid Examples a1 to a8, the batteries of Examples c1 to c13 thus fabricated were studied on the respective battery capacities $Q_1$ thereof on the tenth cycle. Subsequent to the tenth discharge cycle, the alkaline secondary batteries were stored at 65° C. for two weeks. Then, at the completion of another 10 charge/discharge cycles, battery capacities $Q_2$ of the alkaline secondary batteries were determined. At the same time, battery weight decreases from the initial weights right after the fabrication were determined for the respective batteries. The results are shown in Table 3 as below.

TABLE 3

| | POSITIVE-ELECTRODE ACTIVE MATERIAL COMPOSITION RATIO (mol %) | | | BATTERY CAPACITY (mAh) | | BATTERY WEIGHT DECREASE |
|---|---|---|---|---|---|---|
| | Ni | Mn | (M) | ($Q_1$) | ($Q_2$) | (mg) |
| Example c1 | 81.7 | 18 | Al 0.3 | 1060 | 990 | 2 |
| Example c2 | 81 | 18 | Al 1 | 1050 | 1000 | 0 |
| Example c3 | 80 | 18 | Al 2 | 1060 | 1010 | 0 |
| Example c4 | 77 | 18 | Al 5 | 1040 | 1000 | 0 |
| Example c5 | 72 | 18 | Al 10 | 990 | 960 | 0 |
| Example c6 | 62 | 18 | Al 20 | 870 | 840 | 0 |
| Example c7 | 81.7 | 18 | Y 0.3 | 1050 | 990 | 0 |
| Example c8 | 77 | 18 | Y 5 | 1050 | 1000 | 0 |
| Example c9 | 72 | 18 | Y 10 | 950 | 940 | 0 |
| Example c10 | 81.7 | 18 | Er 0.3 | 1050 | 990 | 0 |
| Example c11 | 77 | 18 | Er 5 | 1070 | 1020 | 0 |
| Example c12 | 72 | 18 | Er 10 | 940 | 930 | 0 |
| Example c13 | 78 | 18 | Al + Y 2 + 2 | 1060 | 1030 | 0 |

According to the results, with decrease in the amount of the trivalent metal (M) other than manganese contained in the positive-electrode active material, the alkaline secondary battery suffered increased decline in the battery capacity $Q_2$ when subjected to 10 charge/discharge cycles subsequent to the two-week storage in the discharged state and under high temperature conditions. Additionally, the battery also suffered greater weight decrease resulting from the leakage of gas or electrolyte solution. On the other hand, if the battery contains an increased amount of the trivalent metal (M) other than manganese, the battery contains a correspondingly decreased amount of nickel. Hence, the alkaline secondary battery containing the increased amount of trivalent metal other than manganese presented a small initial battery capacity right after the fabrication thereof. On this account, the trivalent metal (M) other than manganese is preferably present in a proportion of between 0.3 and 10 mol % and more preferably between 1 and 5 mol % based on total metal elements contained in the positive-electrode active material.

Where Y and Al was used in combination as the trivalent metal (M) other than manganese, the decline in the battery capacity was further reduced after the discharged battery was stored under the high temperature condition. This is believed to be brought by a synergistic effect between Y and Al. The same effect may also be obtained by the combined use of Al and Er, as well as Y and Er.

According to the aforesaid examples hereof, the positive-electrode active material was prepared by using sulfates of Ni, Mn and the trivalent metal (M) other than manganese such that sulfate ions may be retained between layers of the $\alpha$-Ni(OH)$_2$ crystal structure for suppressing the transformation thereof. A similar effect may be obtained by using oxacates, such as carbonates, borates and phosphates, of Ni, Mn and the trivalent metal (M) other than manganese and allowing the ions thereof to be retained between the layers of the $\alpha$-Ni(OH)$_2$ crystal structure.

Although $\alpha$-Ni(OH)$_2$ incorporating therein Mn and the trivalent metal (M) other than manganese is used as the positive-electrode active material in the aforesaid examples hereof, such a positive-electrode active material may be used in a partially or totally oxidized state. In this case, the negative-electrode active material may contain zinc oxide in a decreased proportion but zinc in an increased proportion.

The positive-electrode active materials of the foregoing examples hereof have been illustrated by way of example of the application thereof to the alkaline secondary battery of inside-out type construction. It is to be appreciated that a similar effect may be obtained by applying the positive-electrode active materials of the invention to the flat-coin type alkaline secondary batteries as well as to the spiral-type alkaline secondary batteries suitable for quick charge. The spiral-type alkaline secondary battery is constructed such that the positive electrode and the negative electrode, with the separator interposed therebetween, are wound into a spiral form and received in the battery case.

Although the present invention has been fully described by way of examples, it is to be noted that various changes and modifications will be apparent to those skilled in the art.

Therefore, unless otherwise such changes and modifications depart from the scope of the present invention, they should be construed as being included therein.

What is claimed is:

1. A positive-electrode active material for use in an alkaline secondary battery of an inside-out type construction wherein a negative-electrode active material comprises zinc, and a positive-electrode active material and the negative-electrode active material constitute not less than 70% in total based on volume of a battery case, the positive-electrode active material comprising an $\alpha$-Ni(OH)$_2$ crystal structure which incorporates therein manganese Mn and erbium Er.

2. The positive-electrode active material for alkaline secondary battery of claim 1, wherein manganese Mn is present in a proportion of between 8 and 50 mol % based on total metal elements contained in the positive-electrode active material.

3. The positive-electrode active material for alkaline secondary battery of claim 1, wherein manganese Mn is present in a proportion of between 8 and 30 mol % based on total metal elements contained in the positive-electrode active material.

4. The positive-electrode active material for alkaline secondary battery of claim 1, wherein erbium Er is present in a proportion of between 0.3 and 10 mol % based on total metal elements contained in the positive-electrode active material.

5. The positive-electrode active material for alkaline secondary battery of claim 1, wherein erbium Er is present in a proportion of between 1 and 5 mol % based on total metal elements contained in the positive-electrode active material.

* * * * *